US012629310B2

(12) United States Patent
Yan et al.

(10) Patent No.: US 12,629,310 B2
(45) Date of Patent: May 19, 2026

(54) SINGLE-LOWER-LIMB REHABILITATION EXOSKELETON APPARATUS AND CONTROL METHOD

(71) Applicant: ANGELEXO SCIENTIFIC CO., LTD, Zhejiang (CN)

(72) Inventors: Fenghui Yan, Zhejiang (CN); Luya Li, Zhejiang (CN); Jian Zhang, Zhejiang (CN)

(73) Assignee: ANGELEXO SCIENTIFIC CO., LTD, Zhejiang (CN)

( * ) Notice: Subject to any disclaimer, the term of this patent is extended or adjusted under 35 U.S.C. 154(b) by 751 days.

(21) Appl. No.: 17/926,365

(22) PCT Filed: Jul. 13, 2021

(86) PCT No.: PCT/CN2021/105892
§ 371 (c)(1),
(2) Date: Nov. 18, 2022

(87) PCT Pub. No.: WO2022/012491
PCT Pub. Date: Jan. 20, 2022

(65) Prior Publication Data

US 2023/0210707 A1 Jul. 6, 2023

(30) Foreign Application Priority Data

Jul. 13, 2020 (CN) ......................... 202010672072.6

(51) Int. Cl.
*A61H 3/00* (2006.01)
*A61H 1/02* (2006.01)

(52) U.S. Cl.
CPC ............ *A61H 3/00* (2013.01); *A61H 1/0262* (2013.01); *A61H 1/0266* (2013.01);
(Continued)

(58) Field of Classification Search
CPC .. A61H 3/00–068; A61H 1/0237–0244; A61H 1/0262; A61H 1/0266;
(Continued)

(56) References Cited

U.S. PATENT DOCUMENTS

| | | | |
|---|---|---|---|
| 10,390,973 B2 | 8/2019 | Tong et al. | |
| 2012/0116258 A1 | 5/2012 | Lee | |
| 2022/0032447 A1* | 2/2022 | Mooney | B25J 9/0006 |

FOREIGN PATENT DOCUMENTS

| | | | |
|---|---|---|---|
| CN | 103505342 A | 1/2014 | |
| CN | 105476817 A * | 4/2016 | A61H 1/0262 |

(Continued)

OTHER PUBLICATIONS

Translation of CN 105476817. Accessed from Search on Aug. 7, 2025. (Year: 2016).*

(Continued)

*Primary Examiner* — Paige Kathleen Bugg
(74) *Attorney, Agent, or Firm* — MUNCY, GEISSLER, OLDS & LOWE, P.C.

(57) ABSTRACT

A single-lower-limb rehabilitation exoskeleton apparatus and control methods includes a controller, an intact lower-limb component and a paretic lower-limb component connecting communicatively with the controller. The controller is used to determine the current state of the intact lower-limb through the intact lower-limb component and the current state of the paretic lower-limb through the paretic lower-limb component. When the intact lower-limb component is in the lifting state, the movement data of the intact lower-limb is collected and sent to the controller. The controller is used to determine the corresponding gait data for the paretic lower-limb component according to the movement data of the intact lower-limb and send the gait data to the paretic lower-limb component. The paretic lower-limb component
(Continued)

is used to drive the paretic lower-limb to move or walk according to the gait data while the intact lower-limb is in the supporting state.

13 Claims, 6 Drawing Sheets

(52) U.S. Cl.
CPC .................. *A61H 2003/007* (2013.01); *A61H 2201/1207* (2013.01); *A61H 2201/164* (2013.01); *A61H 2201/165* (2013.01); *A61H 2201/5046* (2013.01); *A61H 2201/5069* (2013.01); *A61H 2201/5071* (2013.01); *A61H 2201/5076* (2013.01); *A61H 2230/625* (2013.01)

(58) Field of Classification Search
CPC ...... A61H 2201/1207; A61H 2201/164; A61H 2201/165; A61H 2201/5046; A61H 2201/5069; A61H 2201/5071; A61H 2201/5076; B25J 9/0005
USPC .............................................................. 601/5
See application file for complete search history.

(56) References Cited

FOREIGN PATENT DOCUMENTS

| | | | | | |
|---|---|---|---|---|---|
| CN | 108939436 | A | | 12/2018 | |
| CN | 109568089 | A | | 4/2019 | |
| CN | 110812127 | A | * | 2/2020 | ........... A61B 5/1038 |
| CN | 110974631 | A | * | 4/2020 | ............... A61H 3/00 |
| CN | 111249116 | A | * | 6/2020 | ............... A61H 3/00 |
| CN | 111773037 | A | | 10/2020 | |
| JP | 2006314670 | A | * | 11/2006 | ............. A61H 1/024 |
| WO | WO-2010074160 | A1 | * | 7/2010 | ............. A61H 1/024 |

OTHER PUBLICATIONS

Translation of CN 110812127. Accessed from Search on Aug. 7, 2025. (Year: 2020).*
Translation of CN 111249116. Accessed from Search on Aug. 7, 2025. (Year: 2020).*
Translation of JP 2006/314670. Accessed from Search on Aug. 7, 2025. (Year: 2006).*
Translation of WO 2010/074160. Accessed from Search on Aug. 7, 2025. (Year: 2010).*
Translation of CN 110974631. Accessed from Espacenet on Aug. 6, 2025. (Year: 2020).*

* cited by examiner

SINGLE-LOWER-LIMB REHABILITATION EXOSKELETON APPARATUS AND CONTROL METHOD

CROSS-REFERENCE TO RELATED APPLICATION

This application claims the priority of China's prior application, application No.: 202010672072, application date: Jul. 13, 2020, the entire contents of being hereby incorporated by reference herein.

FIELD OF INVENTION

The invention relates to the technical field of rehabilitation exoskeleton, in particular to the single-lower-limb rehabilitation exoskeleton apparatus and control method thereof.

BACKGROUND

Rehabilitation exoskeleton is a kind of wearable rehabilitation apparatus. At present, the rehabilitation exoskeleton usually carries out physical rehabilitation training for patient by controlling the movement of patient's dual lower-limbs. For example, the patient initiates the movement of his/her lower-limbs by operating the controller with upper-limbs, or selecting the preprogramed options. The existing rehabilitation exoskeleton, however, does not provide relearning of the walking gait of the patient, and does not allow patient to control the movement proactively either, furthermore it is deficient in information interaction with the patient, and thus has no solution for individualized physical rehabilitation training.

SUMMARY OF THE INVENTION

Therefore, the objective of this invention is to provide a single-lower-limb rehabilitation exoskeleton apparatus and its control methods, which can better support the patient with proactive gait control, and can also incorporate the information interaction between the patient and the single-lower-limb rehabilitation exoskeleton apparatus, thus to support individualized physical rehabilitation training.

In the first aspect, the embodiment of the invention provides a single-lower-limb rehabilitation exoskeleton apparatus, including a controller and an intact lower-limb component and a paretic lower-limb connecting communicatively with the controller; Wherein the intact lower-limb component is used to be attached to the intact lower-limb of the patient, and the paretic lower-limb component is used to be attached to the paretic lower-limb of the patient;

The controller is used for determining the current state of the intact lower-limb through the intact lower-limb component, and determining the current state of the paretic lower-limb through the paretic lower-limb component;

The intact lower-limb component is used for collecting the state data of the intact lower-limb and sending the state data to the controller;

The controller is used to determine the corresponding state data of the paretic lower-limb component according to the state data of the intact lower-limb, and send the state data to the paretic lower-limb component, so as to control the state of the paretic lower-limb.

The intact lower-limb described herein can be all parts of the whole single lower-limb, such as thigh, lower leg, foot, and joints connecting the above parts, such as ankle joint, knee joint, hip joint, etc., forming the whole intact lower-limb. Of course, it can be part of the structure of an intact lower-limb, such as the thigh, lower leg, and the knee joint connecting the thigh and lower leg.

In some optional ways, some movement parameters or state data of the intact lower-limb can be used to control the movement or state of the paretic lower-limb, so that the paretic lower-limb can move or walk, or the paretic lower-limb can be driven by the paretic lower-limb component, so that the movement of both lower-limbs can be much more coordinated. In this way, the purpose of rehabilitation training for the paretic lower-limb can be achieved. The concept of intact or paretic lower-limb is comparative. Generally, the intact lower-limb can walk independently, while the paretic lower-limb is paralyzed and cannot walk without extra help. Of course, in some embodiments, the state or movement data of the intact lower-limb is collected by the intact lower-limb component attached to the intact lower-limb, and the data collected by the component is sent to the controller. Certainly, the controller can also collect information from the component, and the collected information is used by the controller to control the movement of the paretic lower-limb. In other ways, a mechanical component is also attached to the paretic lower-limb, the component is controlled by the controller, or the component receives the gait data sent by the controller, so as to drive the paretic lower-limb to move accordingly. The movement of the paretic lower-limb component drives the movement of the paretic lower-limb. Alternatively, the controller can collect data from both the intact and paretic lower-limbs, such as state data including indications for supporting, standing, lifting, walking, etc.

It can be understood that the state data comprises the states of standing, lifting and walking, and the processing data from lifting to approaching the ground for completion of the walking cycle of the intact lower-limb. These processing or movement parameters are collected, determined and calculated by the controller, and then to be used for guiding or controlling the movement of the paretic lower-limb component attached to the paretic lower-limb, so as to drive the movement of the paretic lower-limb.

Without doubt, the controller can also have the function of self-adjustment or self-learning. For example, different patients have their own walking habits. Once the mechanical components of the invention are used, the states or parameters interpreting walking habits of the intact lower-limb are collected and relearned by the controller. The data collection, analysis and the relearning process may be repeated several cycles to obtain the movement data of intact lower-limb, naturally, it can be done in real time. In addition, the controller can control or correct the movement of the paretic lower-limb according to the gait data of the paretic lower-limb.

In some embodiments, the state comprises a lifting state or a supporting state. The state herein can also be understood to include a walking state or a standing state. The state data includes gait data of standing, supporting, lifting or walking. The state data can come from the intact lower-limb component. Of course, the controller obtains the state data of intact lower-limb for analysis and calculation and controls the state of the paretic lower-limb component according to the state data of intact lower-limb, so as to drive the paretic lower-limb to move or control the state of the paretic lower-limb, such as gait data of the paretic lower-limb for controlling its states of supporting, lifting, walking, etc.

In some embodiments, when the intact lower-limb is in standing or supporting state, the current state data of the intact lower-limb is collected by the intact lower-limb component and sent to the controller. The controller controls the state of the paretic lower-limb by receiving the state data of the intact lower-limb component and sending the state data, such as standing or supporting, to the paretic lower-limb component.

In some embodiments, the state may also include gait data in the lifting and the walking states. In brief, the state data comprises the movement trajectory or the rotation value of each joint of the intact lower-limb while walking, e.g., the state data in the lifting state may include the lifting height, and the movement data may comprise changes in rotation value of each joint and the swing amplitude of each joint, and so on. The data is collected through the intact lower-limb component, and sent to the controller. Through calculation or determination, the controller sends the gait state or data to the paretic lower-limb component to control the gait state or data of the paretic lower-limb component, and consequently control the gait of the paretic lower-limb.

In some embodiments, the controller obtains the data of the intact lower-limb and, through calculation, sends the data to the paretic lower-limb component to control the movement of the paretic lower-limb. It can be understood that some data of intact lower-limb cannot be directly sent to the paretic lower-limb without calculation for controlling the movement of the paretic lower-limb by the paretic lower-limb component.

In some embodiments, the movement data of the intact lower-limb comprises gait data.

In some embodiments, the controller is used to determine the gait data corresponding to the paretic lower-limb component according to the movement data of the intact lower-limb, and send the gait data to the paretic lower-limb component, so as to control the gait of the paretic lower-limb.

In some embodiments, the gait data comprises one or more of walking step length, walking step height, walking step frequency, paretic ankle angle value, paretic knee angle value and paretic hip angle value.

In some embodiments, the paretic lower-limb component is used to drive the paretic lower-limb to move according to the gait data while the intact lower-limb is in the supporting state. The gait data herein is calculated by the controller according to the data of the intact lower-limb.

In some embodiments, the intact lower-limb component comprises an intact ankle joint sensor, an intact knee joint sensor and an intact hip joint sensor; The intact ankle joint sensor is used for collecting the angle value of the intact ankle joint of the patient; The intact knee joint sensor is used for collecting the angle value of the intact knee joint of the patient; The intact hip joint sensor is used for collecting the intact hip joint angle value of the patient.

In some embodiments, the movement data also comprises an intact plantar pressure value; The intact lower-limb component also comprises a plurality of intact pressure sensors, each of which is used to collect the intact plantar pressure value. In some embodiments, the controller is also used to determine the current state of the intact lower-limb according to the intact planter pressure value.

In some embodiments, the state data comprises the planter pressure value of the paretic lower-limb.

In some embodiments, the paretic lower-limb component also comprises one or more pressure sensors, which are used to collect the paretic planter pressure value of the patient.

In some embodiments, the controller is also used to determine the current state of the paretic lower-limb according to the paretic plantar pressure value. In this way, the state of the paretic lower-limb can be better obtained, and the paretic lower-limb can be better controlled by the controller.

In one embodiment, the paretic lower-limb component comprises one or more joint drive motors for the paretic ankle joint, the paretic knee joint and the paretic hip joint; Each of the joint drive motor is used for controlling the corresponding joint movement of the paretic lower-limb to the desired joint angle value according to the gait data determined by the controller.

In one embodiment, the paretic lower-limb component also comprises a corresponding joint power supply and a corresponding joint power button connected with the joint drive motor; The joint power supply is used for supplying power to the corresponding joint drive motor on the paretic side; The joint power button is used for changing the ON and OFF states of the corresponding joint power supply based on the operational need.

In one embodiment, the intact lower-limb component and the paretic lower-limb component comprise their own fixing units; The fixing unit with the intact lower-limb component is used for attaching the intact lower-limb component to the intact lower-limb; The fixing unit in the paretic lower-limb component is used for attaching the paretic lower-limb component to the paretic lower-limb.

In one embodiment, the apparatus also comprises a storage unit.

In one embodiment, the apparatus also comprises a display component composed by a liquid crystal touch screen, a power indicator, and an operation indicator; The liquid crystal touch screen is used for displaying the movement data and the gait data; The power indicator is used for indicating the power consumption of the joint power supply; The operation indicator is used for indicating the operational status of the single-lower-limb rehabilitation exoskeleton apparatus.

In the second aspect, the embodiment of the invention also provides a control method of the single-lower-limb rehabilitation exoskeleton apparatus comprising: determining the state data of the intact lower-limb by using intact lower-limb component and the state data of the paretic lower-limb by using paretic lower-limb component; The paretic lower-limb component is controlled by using the current state data of the intact lower-limb component, so as to control the state of the paretic lower-limb of the patient.

In some embodiments, the state comprises of the current state data or movement data.

In some embodiments, the current state comprises a lifting state or a supporting state.

In some embodiments, the intact lower-limb component is used to determine the current state of the intact lower-limb and the current state of the paretic lower-limb is determined by using paretic lower-limb component.

In some embodiments, the movement data of the intact lower-limb component is obtained while the intact lower-limb is in the lifting state; The gait data is sent to the paretic lower-limb component to drive the paretic lower-limb to move according to the gait data when the intact lower-limb component is in a supporting state.

In some embodiments, the movement data comprises one or more of the intact ankle angle value, the intact knee angle value, and the intact hip angle value; The gait data corresponding to the paretic lower-limb component is determined according to the movement data of the intact lower-limb; Wherein the gait data comprises one or more of the walking step length, walking step height, walking step frequency, ankle angle value, knee angle value and hip angle value on the paretic side.

In one embodiment, gait data corresponding to the paretic lower-limb component is determined according to the movement data of the intact lower-limb, such as gait data including the walking step length and walking step height of the patient is determined according to the angle value of the hip joint, the angle value of the knee joint and the angle value of the ankle joint on the intact side; According to the length of the time while the intact lower-limb is in the lifting state, the walking step frequency of the patient is determined; According to the gait data of the patient determined by the movement data of the intact lower-limb, including the walking step length, walking step height and walking step frequency, the gait data corresponding to the paretic lower-limb component is determined, including the walking step length, the walking step height and the walking step frequency; According to the gait data of the patient determined by the movement data of the intact lower-limb, including the walking step length, walking step height and walking step frequency, the gait data corresponding to the paretic lower-limb component is determined, including the angle value of the ankle joint, the angle value of the knee joint and the angle value of the hip joint on the paretic side; Or, the paretic ankle angle value is determined according to the angle value of the intact ankle joint, the paretic knee angle value is determined according to the angle value of the intact knee joint, the paretic hip angle value is determined according to the angle value of the intact hip joint.

This invention, as an embodiment, provides a single-lower-limb rehabilitation exoskeleton apparatus and control methods comprising a controller, an intact lower-limb component and a paretic lower-limb component connecting communicatively with the controller; The intact lower-limb component is used to be attached to the intact lower-limb, and the paretic lower-limb component is used to be attached to the paretic lower-limb of the patient; The controller is used to determine the current state of the intact lower-limb through the intact lower-limb component and the current state of the paretic lower-limb through the paretic lower-limb component; The current state comprises the lifting state or the supporting state; The intact lower-limb component is used to collect the movement data of the intact lower-limb while the intact lower-limb is in the lifting state, and send the movement data to the controller; The state data includes one or more of the ankle angle value, knee angle value and hip angle value; The controller is used to determine the gait data of the paretic lower-limb component according to the movement data of the intact lower-limb, and send the gait data to the paretic lower-limb component; Gait data comprises one or more of the walking step length, walking step height, walking step frequency, ankle angle value, knee angle value and hip angle value on the paretic side; The paretic lower-limb component of is used to drive the paretic lower-limb to move according to gait data while the intact lower-limb is in the supporting state. While the intact lower-limb is in the lifting state, the above apparatus collects the movement data of the intact lower-limb through the intact lower-limb component, and determines the gait data of the paretic lower-limb by the controller according to the movement data, so that the paretic lower-limb of the patient can be controlled by the paretic lower-limb component according to the gait data, and the patient's proactive gait control is better realized, the information interaction between patient and the single lower-limb rehabilitation exoskeleton apparatus can be realized, and individualized physical rehabilitation training can be realized according to the patient's own movement data.

The other features and advantages of the invention will be described subsequently in specifications, and, in part, become apparent from the description or understood through the implementation of the invention. The purposes and advantages of the invention can be realized and obtained by the structure specially pointed out in the description, claims and drawings.

In order to make the above-mentioned purposes, features and advantages of the invention more obvious and easy to understand, the following text gives the preferred embodiment, in combination with the attached drawings, the details are as follows.

DESCRIPTION OF THE DRAWINGS

In order to more clearly explain the specific embodiments of the invention or the technical solutions in the prior art, the following will be a brief introduction to the specific embodiments or the drawings needed in the description of the existing technology. Obviously, the drawings described below are some embodiments of the invention. For ordinary technicians in the art, without paying creative effort, and other drawings may also be obtained from these drawings.

LABELS

1—belt; 2—thigh fixing bandage; 3—lower leg fixing bandage; 4—ankle fixing bandage; 5—pressure sensor array; 5.1—first intact pressure sensor; 5.2—second intact pressure sensor; 5.3—third intact pressure sensor; 6—sole support; 7—intact ankle joint sensor; 8—leg support; 9—intact knee joint sensor; 10—thigh support; 11—intact hip joint sensor; 100—controller; 200—intact lower-limb component; 300—paretic lower-limb component; 13-1—intact lower-limb; 13-2—paretic lower-limb.

Embodiment

In order to make the purposes, technical solutions and advantages of the embodiments of the invention clearer, the technical solutions of the invention will be described clearly and completely in combination with the embodiments. Obviously, the described embodiments are part of the embodiments of the invention, not all of them. Based on the embodiments in the invention, all other embodiments obtained by ordinary technicians in the art without making creative effort belong to the protection scope of the invention.

At present, the existing rehabilitation exoskeleton robotic products do not provide real-time gait relearning function, i.e., the patient's lower-limbs are completely controlled by the exoskeleton, and the movement of the lower-limbs is controlled by the preprogrammed procedure of the exoskeleton. This training method may not provide the patients with sense of walking and relearning; In addition, the uncomforting mechanical gait control is difficult for patients to accept. In the practice of rehabilitation training, this training method may make the patients experience control difficulties, step disorder, and even the risk of falling; Moreover, because the movement of the intact lower-limb is also controlled by robotic program, the physical rehabilitation of hemiplegia patients is compromised physiologically and psychologically. Based on the above, the implementation of the invention provides a single-lower-limb rehabilitation exoskeleton apparatus and its control methods, which can better realize the patient's proactive gait control and the information interaction between the patient and the single-lower-limb rehabilitation exoskeleton apparatus, thus provide solutions for individualized physical rehabilitation training.

Figure 1:
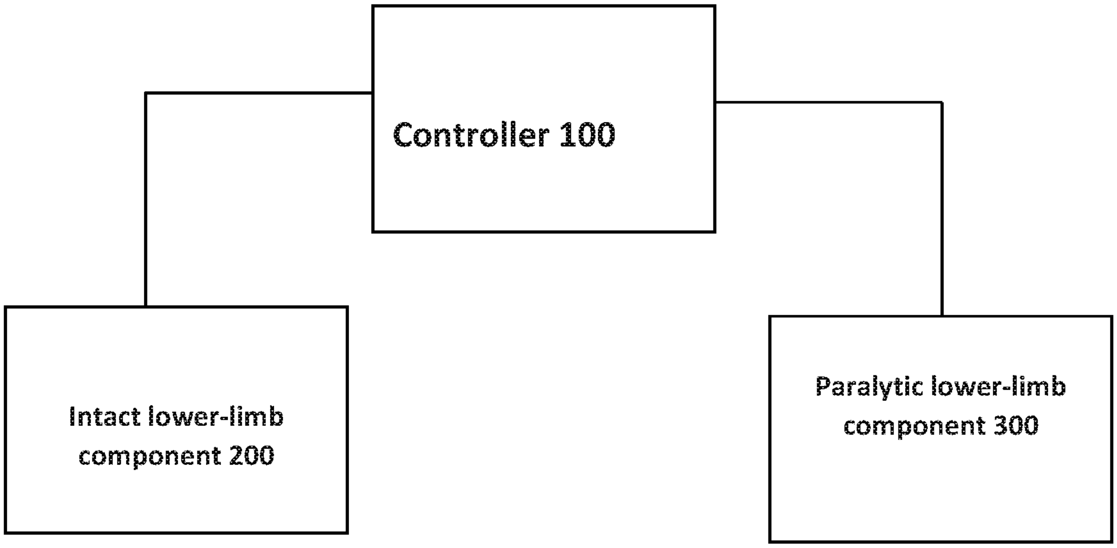
FIG. 1 is a structural diagram of the single-lower-limb rehabilitation exoskeleton apparatus provided by the embodiment of the invention.

To facilitate the understanding of the embodiment, a single-lower-limb rehabilitation exoskeleton apparatus disclosed in the embodiment of the invention is described first in detail. Referring to the structural diagram of the single-lower-limb rehabilitation exoskeleton apparatus shown in FIG. 1, the apparatus comprises a controller 100, an intact lower-limb component 200 and a paretic lower-limb component 300 connecting communicatively with the controller 100, wherein the intact lower-limb component 200 is used to be attached to the intact lower-limb of the patient, and the paretic lower-limb component 300 is used to be attached to the paretic lower-limb of the patient.

In some embodiments, the controller is used to establish or collect the current state data of the intact lower-limb through the intact lower-limb component, and to determine the current state data of the paretic lower-limb through the paretic lower-limb component, for example, the current state may include a lifting state or a supporting state. In one embodiment, the intact plantar pressure value can be collected through the intact lower-limb component to determine the current state of the intact lower-limb according to the intact plantar pressure value. Similarly, the paretic plantar pressure value can be collected through the paretic lower-limb component to determine the current state of the paretic lower-limb according to the paretic plantar pressure value. In this way, the current state of both the intact and paretic lower-limbs can be determined and get ready for the next step, also the initial states of both the intact and paretic lower-limb components can be calibrated to allow for best fitting the patient. The lifting state or supporting state can be detected by the planter pressure sensors.

In some embodiments, the intact lower-limb component is used to collect the state data of the intact lower-limb while the intact lower-limb is in the lifting state, such as movement data, and send the movement data to the controller. The movement data may include one or more of the intact ankle angle value, the intact knee angle value, the intact hip angle value, and the intact plantar pressure value. In one embodiment, the intact lower-limb component can include a plurality of angle sensors, and each angle sensor is respectively set on the intact ankle joint, the intact knee joint and the intact hip joint of the patient, so as to collect the angle value of the intact ankle joint, the angle value of the intact knee joint and the angle value of the intact hip joint of the patient.

The controller is used to determine the corresponding state data of the paretic lower-limb component, such as gait data, according to the movement data of the intact lower-limb, and send the gait data to the paretic lower-limb component. Wherein the gait data comprises one or more of walking step length, walking step height, walking step frequency, paretic ankle angle value, paretic knee angle value and paretic hip angle value. In one embodiment, the walking step length and walking step height of the patient can be determined according to the angle value of the intact hip joint, the angle value of the intact knee joint and the angle value of the intact ankle joint. In one embodiment, the walking step frequency of the patient is determined according to the length of time while the intact lower-limb is in the lifting state. According to the movement data (including walking step length, walking step height and walking step frequency) determined by the intact lower-limb movement, the gait data (including walking step length, walking step height and walking step frequency) corresponding to the paretic lower-limb component is determined. In addition, in some embodiments, the gait data corresponding to the paretic lower-limb component can be determined according to the gait data (including walking step length, walking step height and walking step frequency) of the patient determined by the intact lower-limb movement, such as the paretic ankle angle value, the paretic knee angle value and the paretic hip angle value; The angle value of the paretic ankle joint can be determined according to the angle value of the intact ankle joint, the angle value of the paretic knee joint can be determined according to the angle value of the intact knee joint, and the angle value of the paretic hip joint can be determined according to the angle value of the intact hip joint. In the specific implementation, one of the above two solutions can be selected based on the actual situation to calculate the angle value of the paretic ankle joint, the angle value of the paretic knee joint and the angle value of the paretic hip joint.

The paretic lower-limb component is used to drive the paretic lower-limb to move according to the gait data while the intact lower-limb is in the supporting state. In one embodiment, the paretic lower-limb component may include a plurality of joint drive motors, and each joint drive motor is arranged respectively on the paretic ankle joint, knee joint and hip joint of the patient to drive the paretic ankle joint, knee joint and hip joint of the patient to move according to the gait data. According to the state data of the intact lower-limb, the controller controls these joint drive motors on the paretic lower-limb component comprising ankle joint, knee joint and hip joint to drive the movement of the paretic lower-limb.

The single-lower-limb rehabilitation exoskeleton apparatus provided by the embodiment of the invention collects the movement data of the intact lower-limb through the intact lower-limb component while the intact lower-limb is in the lifting state, and determines the gait data of the paretic lower-limb through the controller according to the movement data, so that the paretic lower-limb component can control the movement of the paretic lower-limb according to the gait data, and better realize the patient's proactive gait control and the information interaction between the patient and the single-lower-limb rehabilitation exoskeleton apparatus, so as to provide the solutions for the individualized physical rehabilitation training according to the patient's movement data.

Based on the single-lower-limb rehabilitation exoskeleton apparatus provided by the above embodiment, the intact lower-limb component of the single-lower-limb rehabilitation exoskeleton apparatus provided by the embodiment of the invention also comprises the intact ankle joint sensor, the intact knee joint sensor, the intact hip joint sensor and a plurality of pressure sensors, and the paretic lower-limb component also comprises the paretic ankle joint drive motor, the paretic knee joint drive motor, the paretic hip joint drive motor and a plurality of pressure sensors. In addition, the intact lower-limb component and the paretic lower-limb component also include the fixing units, which can include a plurality of bandages.

Wherein the intact ankle joint sensor is used to collect the angle value of the intact ankle joint, the intact knee joint sensor is used to collect the angle value of the intact knee joint, the intact hip joint sensor is used to collect the angle value of the intact hip joint, and each intact pressure sensor is used to collect the intact plantar pressure value.

The paretic joint drive motors are used to control the corresponding joint movement of the paretic lower-limb to the desired paretic joint angle values according to the gait data. Specifically, the paretic ankle joint drive motor is used to control the ankle joint movement of the paretic lower-limb to the desired angle value of the paretic ankle joint according to the gait data, the paretic knee joint drive motor is used to control the knee joint movement of the paretic lower-limb to the desired angle value of the paretic knee joint according to the gait data, and the paretic hip joint drive motor is used to control the movement of the hip joint of the paretic lower-limb to the desired angle value of the paretic hip joint according to the gait data, and each paretic pressure sensor is used to collect the paretic plantar pressure value of the patient.

In addition, the controller is also used to determine the current state of the intact lower-limb according to the intact plantar pressure value of the patient and the current state of the paretic lower-limb according to the paretic plantar pressure value.

Figure 2:
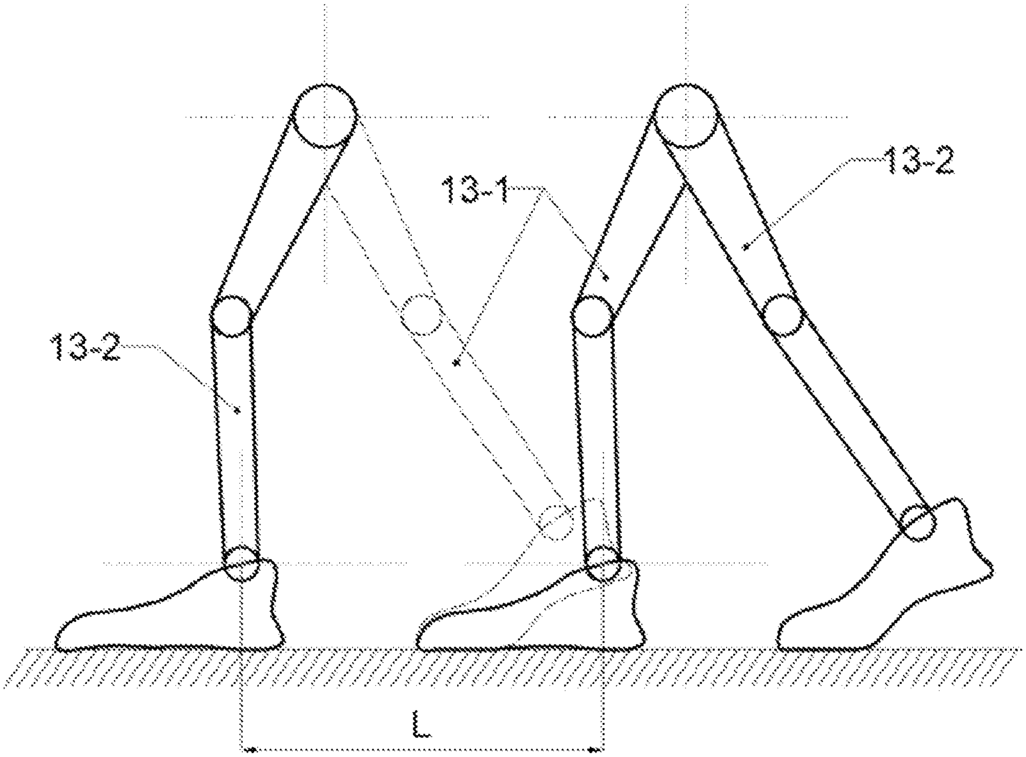
FIG. 2 is a schematic diagram of the patient's lower-limb provided by an embodiment of the invention.
Figure 3:
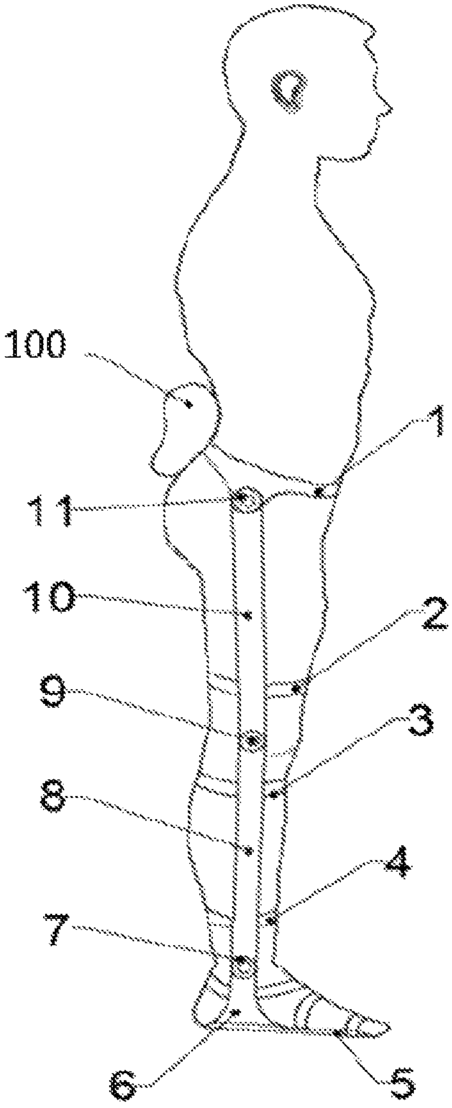
FIG. 3 is a structural diagram of another single-lower-limb rehabilitation exoskeleton apparatus provided by the embodiment of the invention.

To facilitate the understanding of the above embodiments, the implementation of the invention provides a schematic diagram of the lower-limbs of the patient as shown in FIG. 2, and exemplarily marks the intact lower-limb 13-1 on the intact side and paretic lower-limb 13-2 on the paretic side of the patient. The embodiment of the invention takes intact lower-limb 13-1 as an example to further explain the single-lower-limb rehabilitation exoskeleton apparatus. Referring to the structural diagram of the single-lower-limb rehabilitation exoskeleton apparatus shown in FIG. 3, the belt 1 is used to attach the controller 100 and one end of the hip joint angle sensor (i.e., the intact hip joint sensor 11) at the appropriate position of the patient's waist, and the other end of the hip joint angle sensor is placed on the thigh supporting mechanism close to the waist, and the hip joint angle sensor is located near the rotation center of the hip joint; One end of the knee joint angle sensor (i.e., the intact side knee joint sensor 9) is placed on the other end of the thigh supporting mechanism close to the sole of the foot, the other end is fixed on the lower leg supporting mechanism close to the waist, and the knee joint angle sensor is located near the knee joint rotation center; One end of the ankle joint angle sensor (i.e., the intact ankle joint sensor 7) is fixed on the other end of the lower leg supporting mechanism close to the sole of the foot, the other end is fixed on the sole supporting mechanism, and the ankle joint angle sensor is located near the rotation center of the ankle joint. In addition, FIG. 3 also shows that the fixing unit with the intact lower-limb component also comprises a thigh fixing bandage 2, a lower leg fixing bandage 3 and an ankle fixing bandage 4, which are used to attach the intact lower-limb component to the intact lower-limb of the patient. Furthermore, it is shown in FIG. 3 that the intact lower-limb component also comprises sole supporting mechanism 6, lower leg supporting mechanism 8, thigh supporting mechanism 10 and other supporting parts.

It should be noted that the fixing unit in the paretic lower-limb component also comprises thigh fixing bandage, lower leg fixing bandage and ankle fixing bandage, which are used to attach the paretic lower-limb component to the paretic lower-limb of the patient. In addition, the paretic lower-limb component also includes sole supporting mechanism, lower leg supporting mechanism and thigh supporting mechanism.

It can be understood that the controller does not necessarily need to be carried by the patient. When wireless transmission is used, the controller can be operated remotely instead. The data transmission is carried out in the form of wireless communications, such as 5G network.

Figure 4:
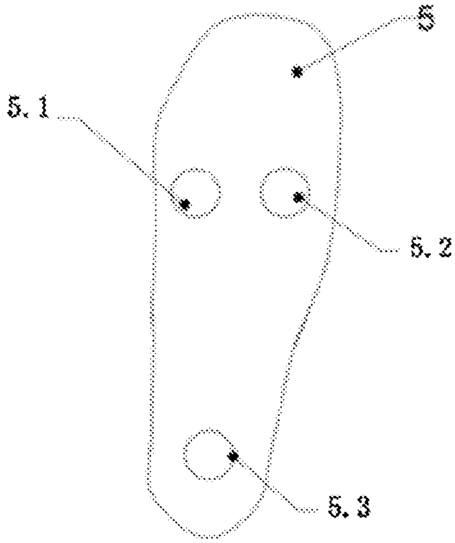
FIG. 4 is a layout diagram of a pressure sensor provided by an embodiment of the invention.

In addition, the embodiment of the invention provides a schematic diagram of the arrangement of pressure sensors. Exemplarily the intact lower-limb component comprises three intact pressure sensors, as shown in FIG. 4, it constitutes a pressure sensor array 5 which is provided with a first intact pressure sensor 5.1, the second intact pressure sensor 5.2 and the third intact pressure sensor 5.3. The first intact pressure sensor 5.1, the second intact pressure sensor 5.2 and the third intact pressure sensor 5.3 are located at the left front, right front and heel of the sole, respectively.

In practical application, the first intact pressure sensor 5.1, the second intact pressure sensor 5.2, the third intact pressure sensor 5.3, the ankle angle sensor, the knee angle sensor and the hip angle sensor transmit the movement data to the controller through the data line or wireless methods.

Figure 5:
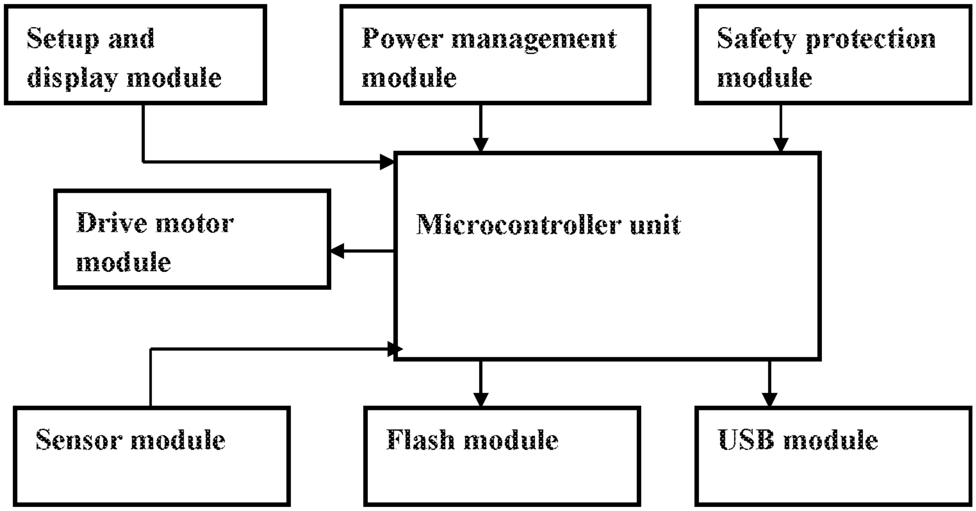
FIG. 5 is a frame diagram of a single-lower-limb rehabilitation exoskeleton apparatus provided by the embodiment of the invention.

Based on the single-lower-limb rehabilitation exoskeleton apparatus provided by the above embodiment, the embodiment of the invention further provides a frame schematic diagram of the single-lower-limb rehabilitation exoskeleton apparatus, as shown in FIG. 5. The single-lower-limb rehabilitation exoskeleton apparatus comprises a microcontroller unit (i.e., the controller), a sensor module, a drive motor module, a setup and display module, a power management module, a control module, a safety protection module, flash module and USB communication module.

In one implementation, microcontroller unit (MCU) can adopt STM32f429 chip based on ARM Cortex-M4 core. Because the STM32f429 chip has Floating Point Unit (FPU) and Digital Signal Processing (DSP) library, it can better perform algorithm operation to meet the requirements for low power consumption and high computing power.

In one embodiment, the setup and display module (i.e., the display component) comprises a liquid crystal touch screen, a power indicator and a status indicator. The liquid crystal touch screen is used to set up and display the movement data and gait data, and the power indicator is used to indicate the power consumption of the joint power supply, for example, the power of the ankle power supply, the knee power supply and the hip power supply respectively, the operation indicator is used to indicate the operation status of the single-lower-limb rehabilitation exoskeleton apparatus. Wherein the power indicator and operation status indicator are red-green dual color light emitting diodes (LED). If the red-green dual color LED is turned on at the same time, it displays in yellow. In the power-on state, the power indicator is red if the power is less than 10%, and green if the power is more than 10%; When the single-lower-limb rehabilitation exoskeleton apparatus is charged, the power indicator is red if the power is less than 10%, yellow if the power is more than 10%, and green if the power is full. The operation status indicator is green in the gait relearning process (i.e., in the normal operation mode) of the single-lower-limb rehabilitation exoskeleton apparatus, and red in case of reaching circuit limit, pressing emergency stop switch, etc. The LCD touch screen is mainly used to set up the thigh length, lower leg length, initial gait characteristic parameters of the paretic lower-limb. In addition, the LCD touch screen also displays the specific error status, equipment model, software version, etc., to facilitate troubleshooting in case of system failure.

In one embodiment, the drive motor module comprises the drive motors of the paretic ankle joint, knee joint, and hip joint, which are installed respectively at the ankle joint, knee joint, and hip joint of the paretic lower-limb component. It can accurately control the joint angle according to the gait relearning algorithm, and has the functions of absolute angle feedback, current feedback, software safety setting, etc.

In one embodiment, the power management module comprises a battery charging management chip, a charging protection circuit, etc., and a customized charger is required for the charging. The paretic lower-limb component also comprises a corresponding joint power supply and a corresponding joint power button connected with the joint drive motor on the paretic side, and the joint power supply is used to supply power to the corresponding joint drive motor on the paretic side; The joint power button is used for changing the ON and OFF states of the corresponding joint power supply based on the operational need. Specifically, taking the paretic knee joint drive motor and hip joint drive motor as examples, the knee joint power supply connected with the paretic knee joint drive motor is used to supply power to the paretic knee joint drive motor, and the hip joint power supply connected with the paretic hip joint drive motor is used to supply power to the paretic hip joint drive motor, and the MCU can collect the current power and charging state of knee joint power supply and hip joint power supply. Specifically, the above power supply can adopt lithium batteries.

In one embodiment, the safety protection module is mainly composed of mechanical limit, hardware circuit limit, software limit, emergency stop switch and other safety protection measures, in which the mechanical limit is mainly realized by applying structural limits on the paretic lower-limb component; The hardware circuit limit can be realized by installing switching circuits. The paretic lower-limb component also comprises a knee joint power button connected with the paretic knee joint drive motor, which is used to change the ON an J OFF states of the knee joint power supply based on the operational need. The paretic lower-limb component also comprises a hip joint power button connected with the paretic hip joint drive motor, which is used to change the ON and OFF states of the power supply of hip joint based on the operational need. In the specific implementation, the hardware circuit limit may cut off the power supply of the drive motor by installing the switching circuit with the joint transmission mechanism. The MCU can only detect the ON and OFF states of the switching circuit, but can not control it; Software limit is to restrict the angle movement after the angle values of hip joint and knee joint on the paretic side are solved by the gait algorithm; The emergency stop switch may also cut off the power supply of the drive motor directly, and MCU can only detect the ON and OFF state of the emergency stop switch.

In one embodiment, the sensor module may include two absolute encoders and two pressure sensors. For example, two absolute encoders are installed respectively at the hip joint and knee joint of the intact lower-limb to collect the gait trajectory of the intact lower-limb in real time; Two pressure sensors are installed on the soles of the intact lower-limb and the paretic lower-limb respectively to determine whether the patient is balanced. The feedback data of the pressure sensors will also be integrated into the gait algorithm.

In one embodiment, the flash module (i.e., storage unit) stores basic information of the paretic lower-limb, such as thigh length, lower leg length and initial gait characteristic parameter, etc., and also records the cumulative gait characteristic parameters of the patient and product logs.

In one implementation, the USB (Universal Serial Bus) module is used to set various parameters, obtain gait characteristics of the patient and query product logs.

The single-lower-limb rehabilitation exoskeleton apparatus provided by the embodiment of the invention is used to control the rehabilitation training for the paretic lower-limb of the patient by collecting the relevant data from individual patient's own intact lower-limb, so as to enhance the walking comfort and solve coordination problems caused by individual differentiation during the rehabilitation training, In order to achieve the purpose of individualized rehabilitation treatment.

Figure 6:
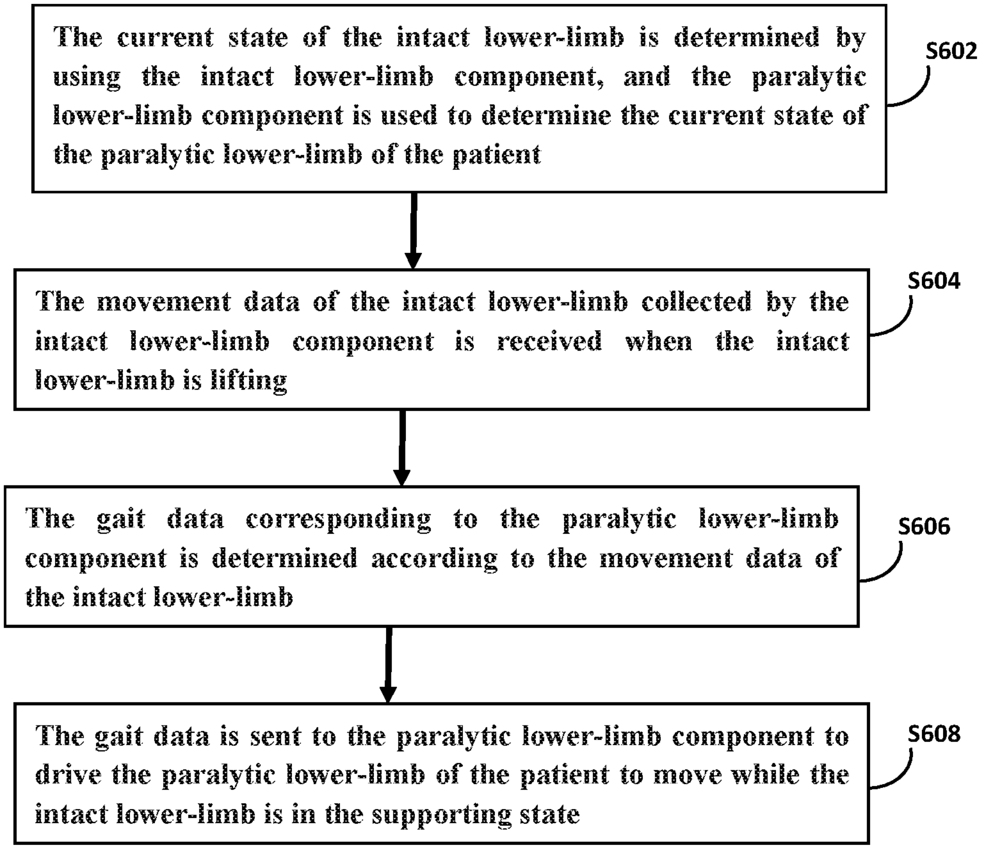
FIG. 6 is a flow diagram of the control method of the single-lower-limb rehabilitation exoskeleton apparatus provided by the embodiment of the invention.

Based on the single-lower-limb rehabilitation exoskeleton apparatus provided in the above embodiment, the embodiment of the invention provides a control method for the single-lower-limb rehabilitation exoskeleton apparatus, which is applied to the single-lower-limb rehabilitation exoskeleton apparatus provided in the above embodiment. Referring to the flow diagram of a control method of the single-lower-limb rehabilitation exoskeleton apparatus shown in FIG. 6, the method mainly comprises the following steps, S602 to S608:

In step S602, the current state of the intact lower-limb is determined by using the intact lower-limb component, and the paretic lower-limb component is used to determine the current state of the paretic lower-limb of the patient, wherein the current state comprises the lifting state or the supporting state. In one embodiment, the current state of the intact lower-limb can be determined based on the plantar pressure value which is collected by the pressure sensor with the intact lower-limb component. Specifically, in the walking cycle on the solid and flat ground, while the paretic lower-limb is standing still, the intact lower-limb steps forward and the intact foot heel is touching the ground slowly; the pressure $P_{3i}$ is gradually increased with the third pressure sensor 5.3 located in the intact foot heel. When the intact foot palm is approaching the ground, the first pressure sensor 5.1 and the second pressure sensor 5.2 underneath the intact foot detect the increasing pressures of $P_{1i}$ and $P_{2i}$. If $P_{1i}+P_{2i}+P_{3i}$ is greater than ½ of the body weight and approaching the whole body weight G of the patient, it is indicated that the intact lower-limb is in the supporting state, and the gravity center of the patient is beginning to shift, and the intact lower-limb gradually supports the whole body weight. At this point, the paretic lower-limb component may start to move. When $P_{1i}+P_{2i}+P_{3i}$ is less than G/2, the intact lower-limb of the patients is in its lifting state.

In step S604, the movement data of the intact lower-limb collected by the intact lower-limb component is received when the intact lower-limb is lifting, wherein the movement data comprises one or more of the angle value of the intact ankle joint, the angle value of the intact knee joint and the angle value of the intact hip joint. In one embodiment, the angle value of the intact ankle joint can be collected by the intact ankle joint sensor, the angle value of the intact knee joint can be collected by the intact knee joint sensor, and the angle value of the intact hip joint can be collected by the intact hip joint sensor.

In step S606, the gait data corresponding to the paretic lower-limb component is determined according to the movement data of the intact lower-limb, wherein gait data comprises one or more of walking step length, walking step height, walking step frequency, paretic ankle angle value, paretic knee angle value and paretic hip angle value. In one embodiment, the walking step length and walking step height of the patient can be determined according to the angle value of the intact hip joint, the angle value of the intact knee joint and the angle value of the intact ankle joint; The walking step frequency is determined according to the length of time while the intact lower-limb is in lifting state; According to the movement data (including walking step length, walking step height and walking step frequency) determined by the intact lower-limb movement, the gait data (including walking step, walking height and walking step frequency) corresponding to the paretic lower-limb component is determined; According to the gait data (including walking step length, walking height and walking step frequency) determined by the intact lower-limb movement data, the gait data corresponding to the paretic lower-limb component is determined, such as the paretic ankle angle value, the paretic knee angle value and the paretic hip angle value. In another embodiment, the paretic ankle angle value of the patient can be determined according to the angle value of the intact ankle joint, the paretic knee angle value of the patient can be determined according to the angle value of the intact knee joint, and the paretic hip angle value of the patient can be determined according to the angle value of the intact hip joint.

In step S608, the gait data is sent to the paretic lower-limb component to drive the paretic lower-limb of the patient to move while the intact lower-limb is in the supporting state. In one embodiment, after receiving the gait data, the paretic lower-limb component can control the ankle joint of the paretic lower-limb to move to the desired angle of the paretic ankle joint according to the gait data through the paretic ankle joint drive motor, and control the knee joint of the paretic lower-limb to move to the desired angle of the paretic knee joint according to the gait data through the paretic knee joint drive motor, and control the hip joint of the paretic lower-limb to move to the desired angle of the paretic hip joint according to the gait data through the paretic hip joint drive motor.

The control method of the single-lower-limb rehabilitation exoskeleton apparatus provided by the embodiment of the invention collects the movement data of the intact lower-limb through the intact lower-limb component while the intact lower-limb is in the lifting state, and determines the gait data of the paretic lower-limb through the controller according to the movement data, so that the paretic lower-limb component can control the movement of the paretic lower-limb according to the gait data. The information interaction between the patient and the single-lower-limb rehabilitation exoskeleton apparatus is achieved, so as to realize the individualized physical rehabilitation training according to the movement data of the patient.

Based on the above step S606, an embodiment of the present invention provides a specific implementation for determining gait data. First, referring to the kinematic solution diagram shown in FIG. 7, $O_1$ is the position of the hip joint rotation center; $O_2$ is the position of the knee joint rotation center; $O_3$ is the position of the ankle joint rotation center; $A_1$ is the place where the foot heel is located on the ground for the previous walking cycle; $A_2$ is the landing site of the foot heel on the ground during the current walking cycle; $A_3$ is the contact point between the foot heel and the ground; $A_4$ is the contact point between the foot palm and the ground; $L_1$ is the effective length of thigh; $L_2$ is the effective length of the lower leg; $\text{đ}_1$ is the angle formed between thigh and vertical axis (i.e., the angle value of hip joint on the intact side); $\text{đ}_2$ is the angle formed between the lower leg and thigh (i.e., the knee angle value on the intact side); $\text{đ}_3$ is the angle formed between the normal of the plane of the foot and the axial direction of the lower leg (i.e., the angle value of the ankle joint on the intact side); X is the abscissa of $O_3$ at any time; $Y_i$ is the ordinate of $O_3$ at any time, and the coordinate of $O_3$ at any time is calculated as follows: $X_i=L_1*\sin\ \text{đ}_1+L_2*\sin(\text{đ}_1-\text{đ}_2)$, and $Y_i=L_1*\cos\ \text{đ}_1+L_2*\text{con}(\text{đ}_1-\text{đ}_2)$ In practical embodiment, the controller of the single-lower-limb rehabilitation exoskeleton apparatus can store the initial gait data $S_0=f(F_{10}, F_{20}, F_{30}, F_{40})$ of the patient. Wherein $F_{10}=f(L_1, \text{đ}_1, T_{N1}, t, \ldots)$ is the function relationship of the thigh length $L_1$, hip angle $\text{đ}_1$, hip torque $T_{N1}$, time t and other parameters; $F_{20}=f(L_1, L_2, \text{đ}_2, T_{N2}, t, \ldots)$ is the function relationship of thigh length $L_1$, lower leg length $L_2$, knee angle $\text{đ}_2$, knee torque $T_{N2}$, time t, etc.; $F_{30}=f(L_2, L_3, \text{đ}_3, T_{N3}, t \ldots)$ is the function relationship of lower leg length $L_2$, sole length $L_3$, ankle angle $\text{đ}_3$, ankle torque $T_{N3}$, time t, etc.; $F_{40}=f(L_3, L_4, L_5, \text{đ}_3, P_{N0}, t \ldots)$ is the function relationship of the sole length $L_3$, sole length $L_4$, sole length $L_5$, ankle angle $\text{đ}_3$, plantar pressure $P_{N0}$, time t, etc. Further, the plantar pressure $P_{N0}=f(P_{10}, P_{20}, P_{30})$, where $P_{10}$ is the intact plantar pressure value collected by the first pressure sensor 5.1, $P_{20}$ is the intact plantar pressure value collected by the second pressure sensor 5.2, and $P_{30}$ is the intact plantar pressure value collected by the third pressure sensor 5.3. In practice, the initial gait parameters $S_0$ of the above-mentioned single-lower-limb rehabilitation exoskeleton apparatus can be obtained by testing or through clinical trial data.

For any time t=i, the gait data of patient wearing exoskeleton rehabilitation apparatus can be stated as $S_i=F(f_{1i}, f_{2i}, f_{3i}, f_{4i})$, wherein $f_{1i}=f(L_1, \text{đ}_1, T_{N1}, t, \ldots)$ is the functional relationship of thigh length $L_1$, hip joint angle $\text{đ}_1$, hip joint torque $T_{N1}$ and time t; $f_{2i}=f(L_1, L_2, \text{đ}_2, T_{N2}, t, \ldots)$ is the functional relationship of thigh length L1, lower leg length L2, knee joint angle $\text{đ}_2$, knee joint torque $T_{N2}$ and time t; $f_{3i}=f(L_2, L_3, \text{đ}_3, T_{N3}, t, \ldots)$ is the functional relationship of lower leg length L2, sole length $L_3$, ankle joint angle $\text{đ}_3$, ankle joint torque $T_{N3}$ and time t; $f_{4i}=f(L_3, L_4, L_5, \text{đ}_3, P_{N0}, t, \ldots)$ is the functional relationship of the patient's sole length L3, sole length L4, sole length L5, ankle angle plantar $\text{đ}_3$, plantar pressure function $P_{Ni}$, time t and other parameters. In addition, $P_{Ni}=f(P_{1i}+P_{2i}+P_{3i})$, $P_{1i}$ is the intact plantar pressure value collected by the first pressure sensor 5.1 at t=i, $P_{2i}$ is the intact plantar pressure value collected by the second pressure sensor 5.2 at t=i, and $P_{3i}$ is the intact plantar pressure value collected by the third pressure sensor 5.3 at t=i. When the patient is standing still (i.e., in the supporting state), the intact lower-limb is in the state of standing, and the paretic lower-limb is in the state of lifting without support, the $P_{1i}+P_{2i}+P_{3i}$ is approximately equal to the patient's weight G.

Figure 7:
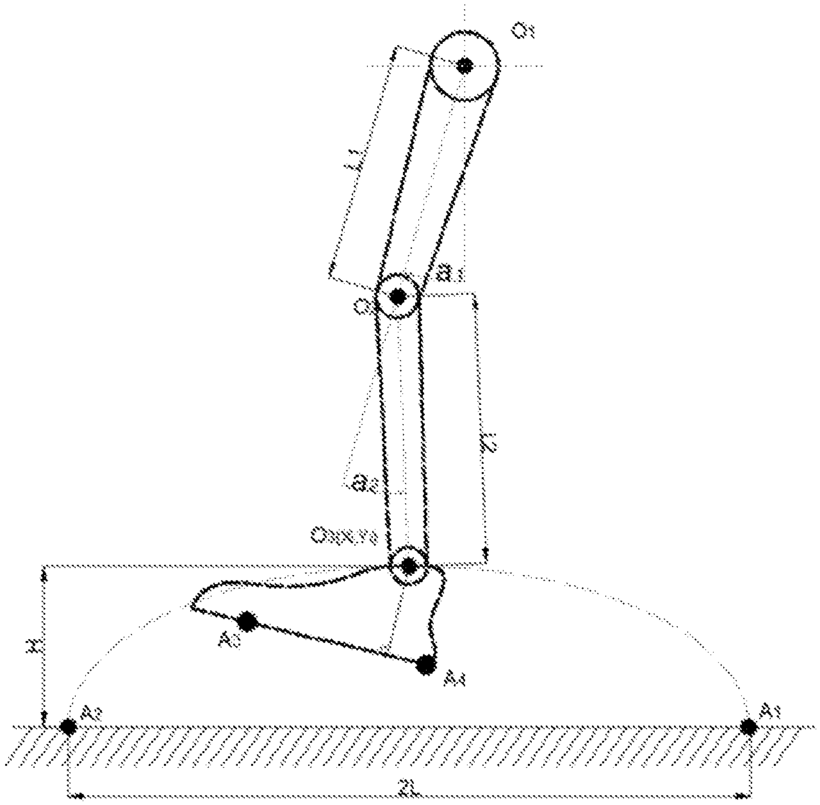
FIG. 7 is a kinematic solution diagram provided by the embodiment of the present invention.
Figure 8:
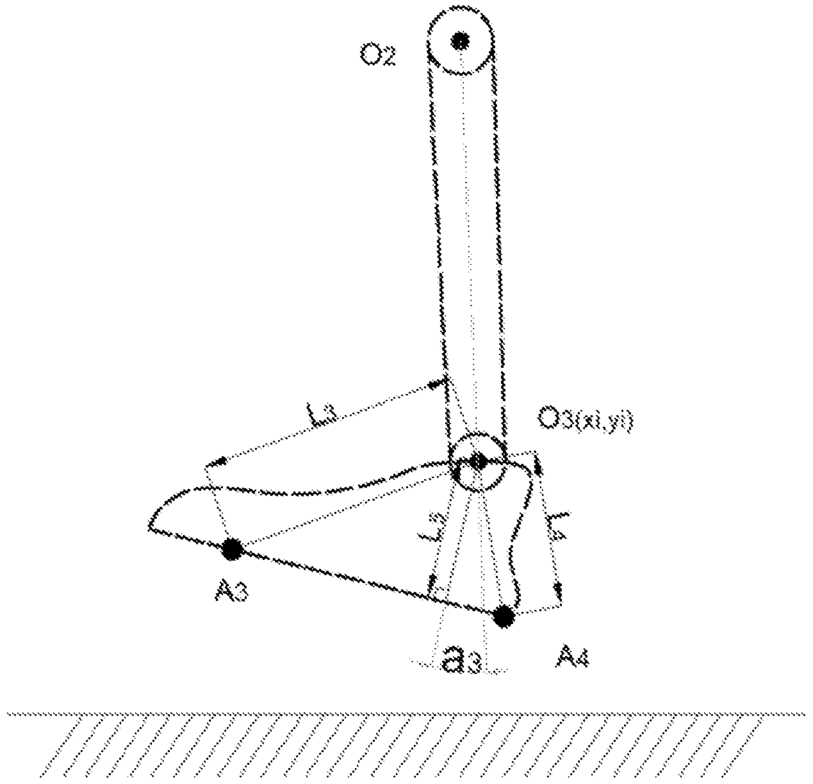
FIG. 8 is another kinematic solution diagram provided by an embodiment of the present invention.

Furthermore, referring to the schematic diagram of another kinematic solution shown in FIG. 8, and combining FIG. 7 and FIG. 8, the plantar pressure sensor can be used to detect the point of time when the foot is touching the ground, and the time interval between two adjacent touchdowns of the same plantar is the instantaneous gait period $T=t_j-t_i$, and further obtain the gait frequency $\eta=T/60$; Taking the maximum absolute value of the abscissa of point O3 to get the walking step length L, i.e., the walking step length $L=|(X_i-X_j)/2|$; The absolute value of the maximum value of the ordinate of the $O_3$ point is the step height H, i.e., the step height $H=|Y_i-Y_j|$; The patient's walking speed $V=L/T=|(X_i-X_j)/2T|$. When the patient is standing still, the vertical line perpendicular to the ground is selected as the reference for joint rotation, the forward rotation of the joint presents positive angle value, and the backward rotation of the joint presents the negative angle value. In a walking cycle, the hip joint angle, knee joint angle, ankle joint angle and other information, as well as the hip joint torque $T_{N1}$, knee joint torque $T_{N2}$, ankle joint torque $T_{N3}$, single step period T, plantar pressure data $P_{Ni}$, etc., via calculation, the patient's walking step length L, walking step height H, walking speed V, walking step frequency or leg swing frequency $\eta$, can be obtained.

Now the patient's target gait data can be obtained as $$S = \sum_{i=0}^{n} (S_1 + S_2 + S_3 + \ldots + S_i + \ldots)/n$$

Wherein S is the average data matrix of the target gait (walking step length L, hip angle knee angle $\text{đ}_1$, knee angle $\text{đ}_2$, ankle angle $\text{đ}_3$ and walking swing frequency $\eta$, etc.); $S_1$ is the data matrix of the first gait parameter acquisition (walking step length L, hip angle knee angle $\text{đ}_1$, knee angle $\text{đ}_2$, ankle angle $\text{đ}_3$ and walking swing frequency $\eta$, etc.); $S_2$ is the data matrix of the second gait parameter acquisition (walking step length L, hip angle knee angle $\text{đ}_1$, knee angle $\text{đ}_2$, ankle angle $\text{đ}_3$ and walking swing frequency $\eta$, etc.); $S_1$ is the data matrix of the i-th gait parameter acquisition (walking step length L, hip angle knee angle $\text{đ}_1$, knee angle $\text{đ}_2$, ankle angle $\text{đ}_3$ and walking swing frequency $\eta$, etc.); n is the number of gait cycles collected.

In practical application, in order to improve the real-time performance of the single-lower-limb rehabilitation exoskeleton apparatus, a light operating system (FreeRTOS) is incorporated with the apparatus, which can make more reasonable and effective use of CPU resources, and better ensure the real-time performance and reliability of the system. In one specific implementation, the single-lower-limb rehabilitation exoskeleton apparatus collects the absolute encoder angles of the intact hip joint and knee joint every 5 ms, and after these parameters are processed by average filtering, median filtering and other algorithms, the motion trajectory of the intact ankle joint is solved by the data of thigh length, lower leg length and so on. At the same time, the gait characteristics data of the intact lower-limb (such as walking speed, walking step height, walking step length and ankle joint movement curve characteristics) are analyzed through the kinematic trajectory of intact limb, and these data are fed back to the control algorithm of paretic lower-limb in real time (the motion trajectory of the paretic lower-limb is calculated according to the movement characteristics, and the movement angles of hip joint and knee joint of the paretic lower-limb are solved inversely). In addition, in order to prevent gait disorder or potential falling, pressure sensors are installed with the intact and paretic lower-limbs of the embodiment to determine whether the patient is stably balanced. The feedback data from the pressure sensors is also incorporated into the gait algorithm.

In addition, in order to improve the safety of the single-lower-limb rehabilitation exoskeleton apparatus, safety measures such as mechanical limit, hardware circuit limit, software limit and emergency stop switch are adopted in the embodiment of the invention to protect the paretic lower-limb. For details, please refer to the preceding embodiment, and the implementation of the invention will not be repeated here.

It should be noted that in order to ensure the relearning of the patient's personal or individualized gait, a standard set of the gait data is established at the beginning, and then the gait data is updated continuously as the patient walks until it is consistent with the gait characteristics of the paretic lower-limb of the patient. Therefore, when a different patient is arranged and attached with the same apparatus, an updated needs to be set for the alternative patient by using the LCD screen. When the patient is used initially, the paretic lower-limb of the single-lower-limb rehabilitation exoskeleton apparatus will walk according to the initial preset gait data (walking step length, hip joint angle, knee joint angle, ankle joint angle, walking step frequency, etc.) at the same time, through the data acquisition system of single-lower-limb rehabilitation exoskeleton apparatus, the relative information of the movement on the intact side of the patient (i.e., the above movement data) are collected and sent to the controller. The controller does analysis on the movement data to obtain the patient's gait data (walking step length, hip joint angle, knee joint angle, ankle joint angle, and walking frequency, etc.), a data acquisition matrix. The controller uses the movement data collected from the intact lower-limb to control the move of the paretic lower-limb component, so that the walking step length, hip joint angle, knee joint angle, ankle joint angle, and walking step frequency of the paretic lower-limb are consistent with the intact lower-limb periodically. Also the data acquisition of the movement on the intact side and the data output to the paretic side are in continued processes in real time.

To sum up, the control method of the single-lower-limb rehabilitation exoskeleton apparatus provided by the embodiment of the invention can establish the patient's unique gait control through autonomous relearning, so that the paretic lower-limb and the intact lower-limb can maintain a coordinated gait in line with the patient's own walking characteristics, such as walking speed, walking step height, walking step length and foot movement curve characteristics, which can be more comfortable, fast, reliable and safe to the patient with individualized physical rehabilitation training.

Finally, it should be noted that the above-mentioned embodiments are only the specific embodiments of the invention, which are used to illustrate the technical solution of the invention rather than limit it. The scope of protection of the invention is not limited to this, although the invention has been described in detail with reference to the above-mentioned embodiments. A person of ordinary skill in the art should understand that any person familiar with the art, within the technical scope disclosed by the invention, can still modify the technical solution described in the preceding embodiment or easily think of changes, or replace some of the technical features equally; and these modifications, changes or substitutions do not make the essence of the corresponding technical solution separate from the spirit and scope of the technical solution of the embodiment of the invention, and should be covered in the protection scope of the invention. Therefore, the protection scope of the invention shall be subject to the protection scope of the claims.

The invention shown and described herein can be realized in the absence of any elements and limitations specifically disclosed herein. The terms and expressions used are used as illustrative terms rather than limitations, and it is not desirable to exclude any equivalents of the features shown and described or parts thereof in the use of these terms and expressions, and it should be recognized that various modifications are feasible within the scope of the present invention. Therefore, although the invention is specifically disclosed by various embodiments and optional features, modifications and variations of the concepts described herein can be adopted by those of ordinary skill in the art, and are considered to fall within the scope of the invention as defined by the appended claims.

The contents of articles, patents, patent applications, and all other literature and information available electronically described or recorded herein are included here for reference to a certain extent, just as each individual publication is specifically and individually indicated for reference. The applicant reserves the right to incorporate any and all materials and information from any such article, patent, patent application or other literature into this application.

The invention claimed is:

1. A single-lower-limb rehabilitation exoskeleton apparatus comprising:

a controller; an intact lower-limb component and a paretic lower-limb component that are connected communicatively with the controller;

the intact lower-limb component is configured to be attached to an intact lower-limb of a patient and the paretic lower-limb component is configured to be attached to a paretic lower-limb of the patient;

wherein the controller is configured to collect current state data of the intact lower-limb and the paretic lower-limb through the intact lower-limb component and the paretic lower-limb component respectively;

wherein the current state data comprises a lifting state or a supporting state, and the controller is configured to control the paretic lower-limb component according to the current state data of the intact lower-limb component;

wherein the intact lower-limb component is configured to collect movement data of the intact lower-limb while the intact lower-limb is in the lifting state, and send the movement data to the controller;

the controller is configured to determine gait data corresponding to the paretic lower-limb component according to the movement data of the intact lower-limb, in order to control movement of the paretic lower-limb;

wherein the paretic lower-limb component is configured to drive the paretic lower-limb to move according to the gait data while the intact lower-limb is in the supporting state;

the intact lower-limb component comprises a first intact pressure sensor, a second intact pressure sensor and a third intact pressure sensor located at a left front, a right front and a heel of a sole of an intact foot, respectively;

wherein the first intact pressure sensor, the second intact pressure sensor, and the third intact pressure sensor underneath the intact foot are each configured to detect respective increasing pressures $P1i$, $P2i$, and $P3i$ when the paretic lower-limb is in the supporting state and a palm of the intact foot is approaching the ground, and when the palm of the intact foot is positioned to contact the ground, if $P1i+P2i+P3i$ is greater than ½ of a body weight G of the patient and approaching the whole body weight G of the patient, it is indicated to the controller that the intact lower-limb is in the supporting state, and when $P1i+P2i+P3i$ is less than G/2, it is indicated to the controller that the intact lower-limb of the patient is in its lifting state;

wherein the controller is initially configured to establish a standard set of the gait data, and thereafter the controller is configured to update the gait data continuously as the patient walks until it is consistent with gait characteristics of the paretic lower-limb of the patient.

2. The apparatus according to claim 1, wherein the movement data comprises one or more of an angle value of an ankle joint, an angle value of a knee joint, and an angle value of a hip joint on an intact side and a plantar pressure value on the intact side.

3. The apparatus according to claim 1, wherein the gait data comprises one or more of walking step length, walking step height, walking step frequency, paretic ankle angle value, paretic knee angle value, paretic hip angle value and plantar pressure value on an intact side.

4. The apparatus according to claim 1, wherein the intact lower-limb component comprises one or more of an ankle joint sensor, a knee joint sensor and a hip joint sensor; the ankle joint sensor is configured to collect an angle value of an intact ankle joint of the patient; the knee joint sensor is configured to collect an angle value of an intact knee joint of the patient; the hip joint sensor is configured to collect an angle value of an intact hip joint of the patient.

5. The apparatus according to claim 1, wherein the movement data further comprises an intact plantar pressure value;

the intact lower-limb component further comprises one or more pressure sensors, each of the first intact pressure sensor, the second intact pressure sensor, and the third intact pressure sensor one or more pressure sensors is configured to collect the intact plantar pressure value;

the controller is configured to determine the current state data of the intact lower-limb according to the intact plantar pressure value.

6. The apparatus according to claim 1, wherein the paretic lower-limb component further comprises one or more pressure sensors on a paretic side, each of the one or more pressure sensors on the paretic side is configured to collect a plantar pressure value on the paretic side of the patient;

the controller is configured to determine the current state data of the paretic lower-limb according to the paretic plantar pressure value of the paretic side.

7. The apparatus according to claim 1, wherein the paretic lower-limb component comprises one or more joint drive motors for a paretic ankle joint, a paretic knee joint and a paretic hip joint; the one or more joint drive motors are configured to control the movement of a corresponding joint of the paretic lower-limb according to joint angle values based on the gait data.

8. The apparatus according to claim 7, wherein the paretic lower-limb component further comprises a plurality of joint power supplies supply and a plurality of joint power buttons respectively connected with each of the one or more joint drive motors;

each joint power supply is configured to supply power to a respective one of the one or more joint drive motors on a paretic side;

each joint power button is configured to change on and off states of its respective joint power supply based on an operational need.

9. The apparatus according to claim 1, wherein each of the intact lower-limb component and the paretic lower-limb components includes a fixing unit;

the fixing unit in the intact lower-limb component is configured to attach the intact lower-limb component to the intact lower-limb of the patient.

10. The apparatus according to claim 1, wherein the apparatus further comprises a storage unit for storing the current state data sent out by the intact lower-limb component.

11. The apparatus according to claim 1, wherein the apparatus further comprises a display component, and the display component comprises a liquid crystal touch screen, a power indicator and an operation indicator;

the liquid crystal touch screen is configured to display the movement data and the gait data;

the power indicator is configured to indicate power consumption of a joint power supply;

the operation indicator is configured to indicate an operation status of the single-lower-limb rehabilitation exoskeleton apparatus.

12. The apparatus according to claim 5, wherein the paretic lower-limb component also further comprises one or more pressure sensors on a paretic side, each of the one or more pressure sensors is configured to collect a planter plantar pressure value on the paretic side of the patient;

the controller is configured to determine the current state data of the paretic lower-limb according to the paretic plantar pressure of the paretic side.

13. The apparatus according to claim1, wherein a fixing unit in the paretic lower-limb component is configured to attach the paretic lower-limb component to the paretic lower-limb of the patient.

* * * * *